United States Patent [19]

Troutner

[11] Patent Number: 4,558,789

[45] Date of Patent: Dec. 17, 1985

[54] TRANSFORMER RACK SUPPORT BRACKET APPARATUS

[75] Inventor: Arthur L. Troutner, Boise, Id.

[73] Assignee: Trus Joist Corporation, Boise, Id.

[21] Appl. No.: 502,582

[22] Filed: Jun. 9, 1983

[51] Int. Cl.$^4$ ............................................... A47F 5/08
[52] U.S. Cl. .................................... 211/107; 211/191; 248/218.4
[58] Field of Search ............... 211/107, 189, 191, 190, 211/206; 248/218.4, 219.1, 219.3, 220.3, 230; 108/152

[56] References Cited

U.S. PATENT DOCUMENTS

| | | | |
|---|---|---|---|
| 2,414,078 | 1/1947 | Wetzel | 248/219.1 X |
| 3,374,978 | 3/1968 | Salmon et al. | 211/107 |
| 3,555,747 | 1/1971 | Taylor | 211/107 X |
| 3,562,980 | 2/1971 | Walz, Jr. et al. | 248/219.3 X |
| 3,975,068 | 8/1976 | Speckin | 211/107 X |
| 4,296,904 | 10/1981 | Farmer | 248/218.4 |

OTHER PUBLICATIONS

Copies of two photographs of transformer rack support apparatus using solid wood beam rack in public use prior to 1982.
Pamphlet, "Platforms Section #AFP-3" on transformer rack support apparatus of aluminum, published in 1965 by Aluma-Form, Inc. of Memphis, Tennessee, pp. 1 to 8.

Primary Examiner—Ramon S. Britts
Assistant Examiner—Sarah A. Lechok Eley
Attorney, Agent, or Firm—Klarquist, Sparkman, Campbell, Leigh & Whinston

[57] ABSTRACT

A support bracket apparatus for mounting a transformer rack or other device on a vertical support member such as a wooden pole, is disclosed. The support bracket apparatus includes a pair of hanger members fastened to the opposite sides of the pole by an adjustable fastening means which adjusts the spacing between the hanger members to accommodate different pole diameters. When used to support an electrical transformer rack, a pair of hanger members is employed at each end of the rack which have lower leg portions in engagement with a pair of mounting arms extending from the rack to support the weight of the rack and transformers on such hangers. The adjustable fastening means preferably includes a plurality of threaded sleeves which extend outwardly from an upper leg of the hanger member and threaded collars which engage the projections so that changing the rotational position of the collar adjusts the spacing between the two hangers. Mounting bolts extending through the sleeves and holes in the support poles are attached by nuts to the mounting arms of the transformer rack to mount the assembly on such poles. Alternatively, the threaded sleeves and collars may be replaced by shims on the mounting bolts to adjust the spacing between the hangers. The support rack is in the form of a hollow box beam made of laminated wood members having a concave curved notch in each end closed by a sheet metal cover to provide the two mounting arms on opposite sides of the pole.

17 Claims, 8 Drawing Figures

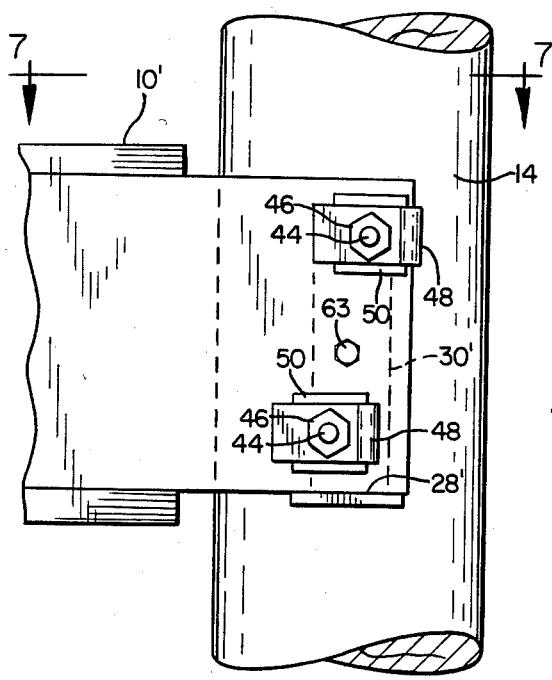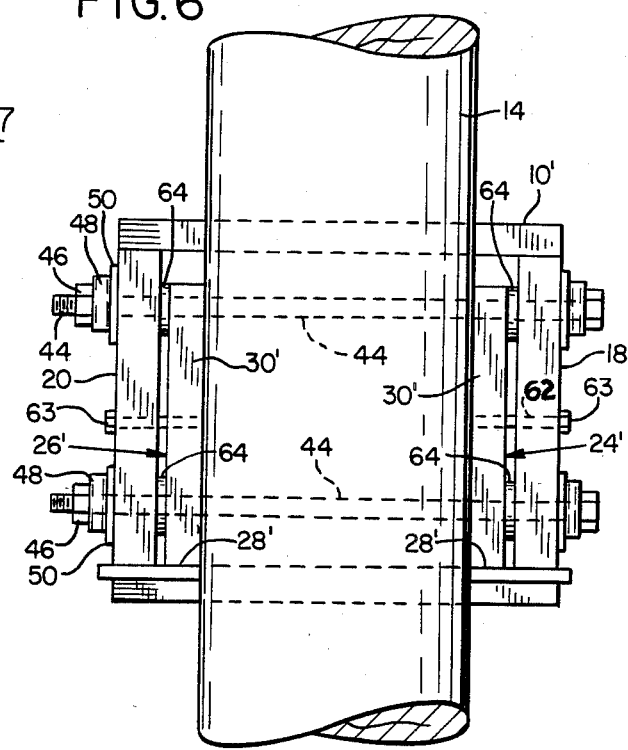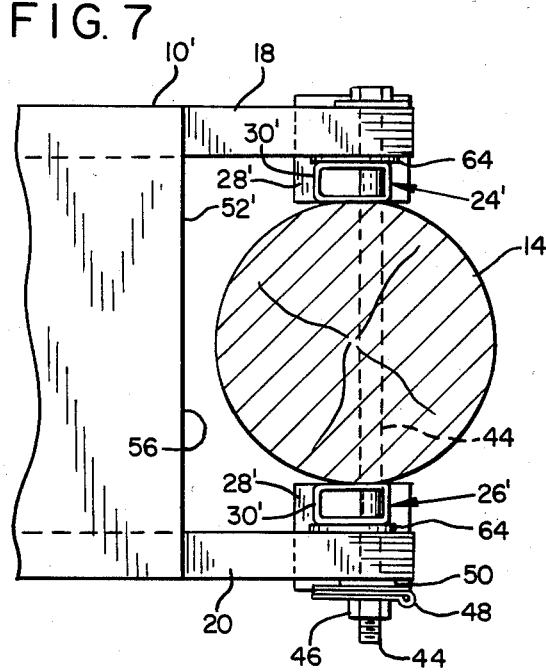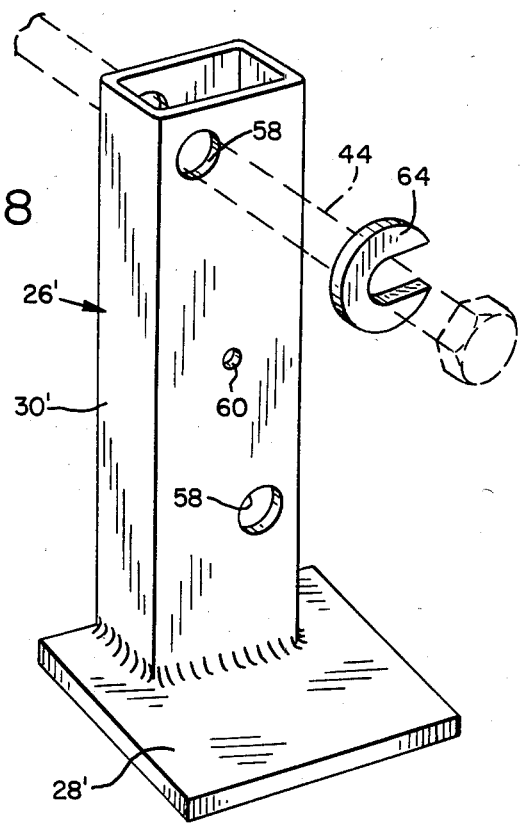

4,558,789

TRANSFORMER RACK SUPPORT BRACKET APPARATUS

BACKGROUND OF THE INVENTION

The subject matter of the present invention relates generally to support bracket apparatus and in particular to support bracket apparatus in which each bracket includes a pair of hanger members for attachment to the opposite sides of a substantially vertical support member such as a wooden pole, and an adjustable fastening means for adjusting the spacing between the hanger members to accommodate support members of different cross-section or different pole diameters. Preferably, the adjustable fastening means includes a threaded adjustment means for adjusting the spacing between the hanger members by rotation of collars on threaded sleeves extending outwardly from such hanger members. The support bracket apparatus of the present invention is especially useful in mounting a transformer rack which supports a plurality of electrical transformers on vertical support members or posts by such support brackets at the opposite ends of such rack.

Previously, transformer racks have been supported on solid wooden beams extending horizontally between two wooden poles fastened to the opposite ends thereof by bolts. Intermediate support poles are sometimes used beneath the beam to provide further support to the beam between the end poles when the weight of the transformers is too great to be supported solely by the beam without such intermediate support poles. This has the disadvantage that the transformer rack is difficult and time-consuming to install because of heavy wooden beams used for the rack and many support poles. Also, the solid wooden beam rack tends to split at the bolt holes because they bear the entire weight of the beam and the transformers directly in contact with the mounting bolts. Previously, it has been proposed to replace the wooden beam rack with an aluminum platform transformer rack which is easier to install because of its lighter weight and absence of intermediate support poles. However, such aluminum rack is more expensive and because it is electrically conductive increases the hazard of shock.

The transformer rack support bracket apparatus of the present invention overcomes these disadvantages by employing a laminated wood box beam rack and metal brackets at the opposite end thereof, each bracket including a pair of hanger members on opposite sides of the vertical support member or pole for supporting the rack on such hanger members which are attached to the end support poles. The box beam sits on a horizontal leg of the hanger and the weight of the beam is transferred to the mounting bolts through the bracket and is not applied to the bolts directly through the box beam, so the wood beam does not split out at the holes in the beam. In addition, the support bracket apparatus of the present invention provides an adjustable fastening means for adjusting the spacing between the pair of hanger members in order to accommodate vertical support members or poles of different cross-section or different pole diameters. By employing a hollow box beam of laminated wood for the transformer support rack, a lightweight, relatively inexpensive, strong, electrically insulative rack is achieved. In addition, the hanger members are preferably provided with threaded sleeves on which threaded collars are provided in order to adjust the spacing between the hanger members simply by rotation of such collars, in a simple and efficient manner. Another advantage of the invention is that the threaded sleeves on the hanger members serve as drill guides for drilling holes through the vertical support member or pole to accommodate fastening bolts which extend through the pole, and through the hollow threaded projections and a pair of spaced mounting arms on each end of the rack member for mounting the assembly on the poles.

SUMMARY OF THE INVENTION

It is therefore one object of the present invention to provide an improved support bracket apparatus which is inexpensive, quick and easy to assemble, and which is capable of carrying heavy loads.

Another object of the invention is to provide such a support bracket apparatus including a pair of hanger members which are attached to the opposite sides of a substantially vertical support member by an adjustable fastening means that enables the spacing between the hanger members to be adjusted to accommodate support members of different cross-section.

A further object of the invention is to provide such a support bracket apparatus for quickly and easily adjusting the spacing between the hanger members by rotation of a threaded adjustment means.

An additional object of the invention is to provide such a support bracket apparatus for supporting an electrical transformer rack in the form of a hollow wooden box beam whose weight is carried on the metal hanger members to prevent splitting the ends of the box beam through which attachment bolts extend and thereby provide a lightweight, strong, electrical insulative transformer support rack assembly.

Still another object of the invention is to provide such a support bracket apparatus of simple construction in which a plurality of hollow threaded sleeves extend from each hanger member and have threaded collars thereon which space the hanger members from the mounting arms of the transformer rack member in order to adjust the spacing between the hanger members by rotating such threaded collars to accommodate vertical mounting members or poles of different cross-section or pole diameter.

A still further object of the invention is to provide such a support bracket apparatus in which the threaded sleeves of the hanger are employed as drill guides for drilling the holes through the vertical support members for speedy accurate assembly of the apparatus.

An additional object of the invention is to provide such a support bracket apparatus in which the hollow box beam is made of laminated wood members and the opposite ends of the box beam are each provided with a concave curved notch conforming generally to the outer surface of the support pole to provide a pair of mounting arms on opposite sides of the support pole to reduce the stress applied to such mounting arms by the weight of the electrical transformers supported thereon.

DESCRIPTION OF DRAWINGS

Other objects and advantages of the present invention will be apparent from the following detailed description of two embodiments thereof and from the attached drawings of which:

FIG. 5 is a partial front elevation view of a second embodiment of the transformer rack support apparatus of the present invention employing a different support bracket;

FIG. 6 is a side elevation view of the transformer rack support apparatus of FIG. 5;

FIG. 7 is a horizontal section view taken along the line 7—7 of FIG. 5; and

FIG. 8 is an enlarged view of the modified support bracket hanger member and spacing adjustment shim used in the support bracket apparatus of FIGS. 5-7.

DESCRIPTION OF PREFERRED EMBODIMENTS

Figure 1:
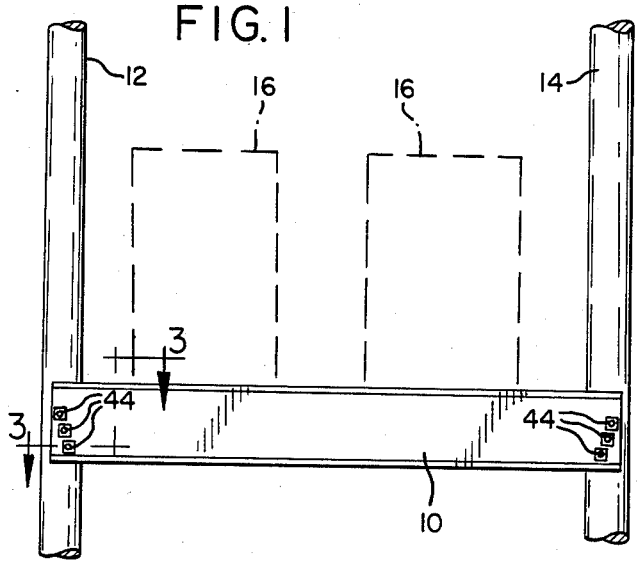
FIG. 1 is a front elevational view of the transformer rack support apparatus made in accordance with the present invention with the ends of the vertical support poles broken away and the transformer shown in dashed lines.
Figure 2:
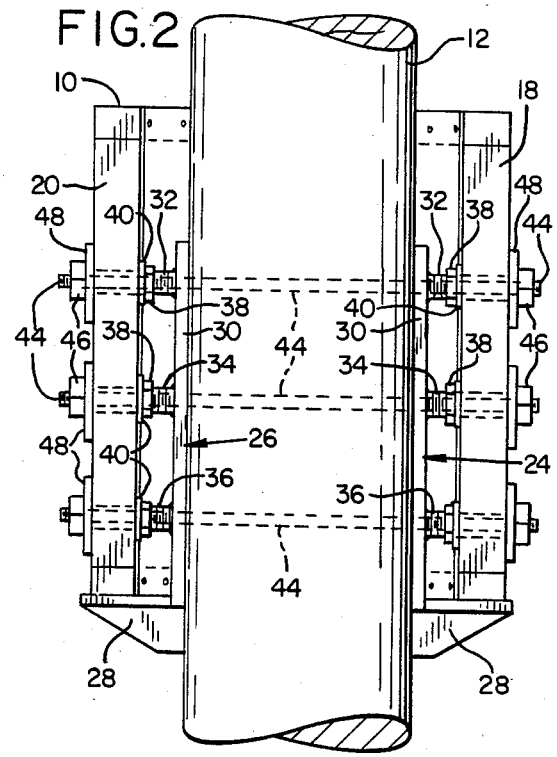
FIG. 2 is an enlarged side elevation view taken of the apparatus of FIG. 1 showing the preferred embodiment of the support bracket apparatus.
Figure 4:
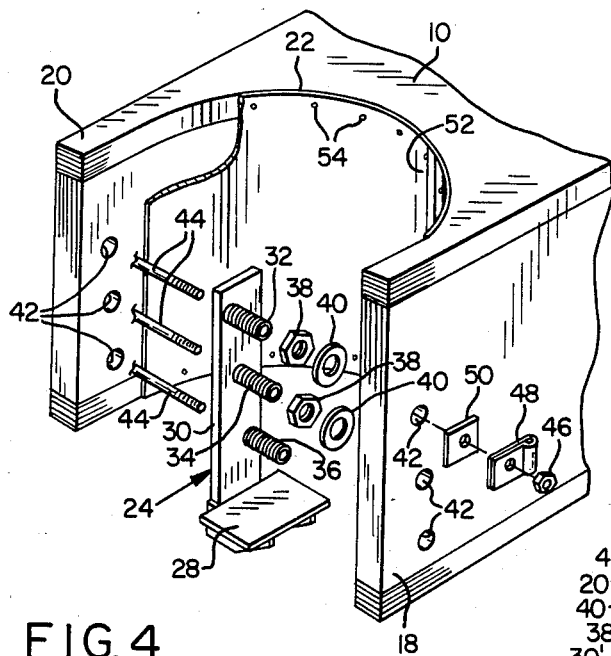
FIG. 4 is an oblique view of a portion of the box beam rack member and part of the support bracket apparatus of FIGS. 2 and 3 with one of the hanger members shown in a detached exploded position.

As shown in FIGS. 1 to 4, one embodiment of the support bracket apparatus of the invention is employed to mount a transformer rack member 10 between a pair of vertical support members 12 and 14 which may be wooden poles of round cross section, such as are commonly used for electrical utility poles. A plurality of electrical transformers 16 are mounted on the upper surface of the transformer rack support member 10 so that such transformers are positioned high above the ground to prevent tampering and to reduce the electrical shock hazard to passersby. The transformer rack member 10 is preferably a hollow wood box beam having a pair of mounting arm portions 18 and 20 extending from each end of the box beam. The mounting arms 18 and 20 are separated by a concaved curved groove 22 in each end of the box beam which conforms in shape to but is spaced from the outer surface of the vertical support member or post 12 or 14 positioned between the mounting arms.

One support bracket apparatus including a pair of hanger members 24 and 26 is provided at each end of the transformer rack member 10 to support the mounting arms 18 and 20 of the box beam on horizontal extending lower leg portions 28 of such hanger members. The lower leg portion 28 is welded to the bottom of a vertical extending upper leg portion 30 of such hanger member. Each of the hanger members 24 and 26 are provided with three externally threaded sleeves 32, 34 and 36 which are welded to and project outwardly from the upper leg portion 30 at different heights spaced vertically apart by about six inches and horizontally displaced with respect to one another about ⅜ inch so that they more uniformly apply the load of the transformer rack 10 and the transformers 16 supported thereon to the support poles 12 and 14.

Figure 3:
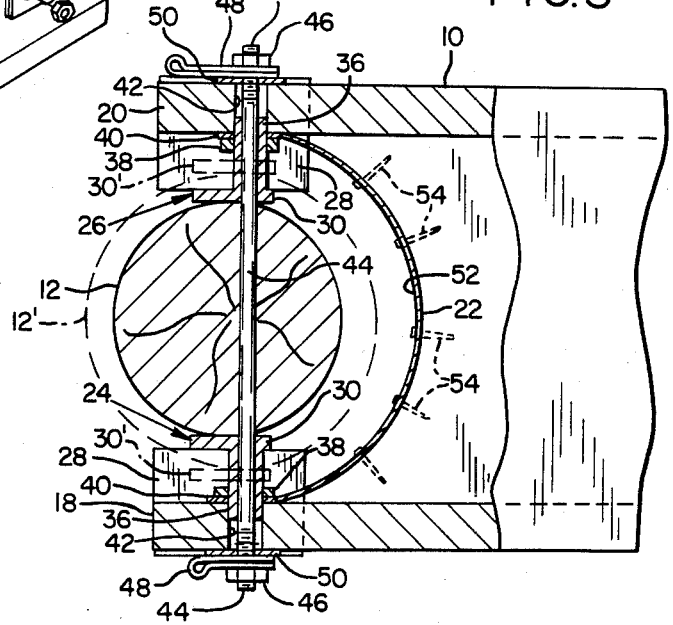
FIG. 3 is an enlarged horizontal section view taken along the line 3—3 of FIG. 1 showing the support bracket apparatus and an end portion of the box beam transformer rack.

Three threaded collars or nuts 38 are provided on the threaded sleeves 32, 34 and 36, respectively, for adjustment of the spacing between the pair or hanger members 24 and 26 by rotation of such threaded collars to accommodate support poles of different diameters as shown by the larger pole 12' and the dashed line portions of hanger leg 30' in FIG. 3. Washers 40 are provided around each of the threaded sleeves 32, 34 and 36 between the threaded collars 38 and the inner surface of the mounting arm portions 18 and 20 of the box beam. The threaded sleeves 32, 34 and 36 on each of the hanger members 24 and 26 extend into mounting holes 42 provided in the sides of the mounting arms 18 and 20 of the box beam. Three mounting bolts 44 extend through the threaded sleeves 32, 34 and 36 and their associated mounting holes 42 in the box beam, as well as through three holes drilled in the vertical support posts 12 and 14 in order to attach the hanger members 24 and 26 to the support poles and to fasten the box beam to the hanger members. However, it should be noted that the entire weight of the box beam 10 and the transformers 16 mounted thereon is supported on the lower leg portions 28 of the hangers and is coupled to the mounting bolts 14 only through the sleeves 32, 34 and 36 of such hangers. Thus, the weight is not directly supported by the bolts 44 in contact with the holes 42 in the mounting arms 18 and 20 of such box beam. This prevents the ends of the box beam from splitting adjacent the holes 42 which was formally the case with solid wooden beams supported merely on bolts without hanger members. The bolts are secured to the box beam 10 by nuts 46 and spring lock washers 48 as well as squared washers 50 positioned between such nuts and the outer surface of the box beam.

A metal sheet cover 52 such as 20 gauge galvanized steel is provided over each end of the box beam 10 and curved to conform to the groove 22 to close the ends of the box beam, such as by means of screws or nails 54 nailed through the sheet material to the top and bottom of the box beam. This sheet metal cover prevents birds and other animals from entering the box beam and also provides a barrier to moisture to prevent rotting.

In one example of the preferred embodiment of FIGS. 1-4, the transformer rack 10 had a length of 24 feet and was capable of supporting a transformer load of up to 30,000 pounds but weighed by 1,500 pounds. This support bracket apparatus was capable of adjusting for different size support poles 12 and 14 having a diameter of between 12 inches and 16 inches. The box beam 10 was 25 inches high and 24 inches wide and is formed with side members 2½ inches thick and a top and bottom member 1½ inches thick made of MICRO=LAM brand laminated wood veneer lumber. The hanger members 24 and 26 are made of fabricated steel plate with the upper leg 30 having a thickness of ¾ inch, a width of 4 inches and a length of 21 inches to 23 inches. The lower leg 28 has a thickness of ⅜ inch, a width of 5½ inches and a length of 8 inches. The threaded sleeves 32, 34 and 36 are 3½ inches long and have an outer diameter of 1 inch. The bolts 44 are ⅝ inches in diameter and 26 inches long when the box beam is 24 inches wide.

A second embodiment of the transformer rack support apparatus of the present invention is shown in FIGS. 5 to 8, and includes a slightly modified box beam 10' having rectangular grooves 56 in the ends of the beam to provide the mounting arms 18 and 20. In addition, the hanger members 24' and 26' are modified from those of the preferred embodiment in that sleeves 32, 34 and 36 are eliminated and the upper leg portion 30' is a hollow rectangular member which is joined at its lower end to the lower leg plate 28'. Bolt apertures 58 are provided through the upper leg 30' at positions corresponding to those of the sleeves 32 and 36 of the preferred embodiment and bolts 44 pass through such apertures to attach the hanger members to the support poles. It should be noted that a smaller third aperture 60 is provided in the front side of the upper leg 30' between bolt apertures 58 in order to attach the hanger members 26' to the box beam by a screw 63 threaded through an opening 62 in the side of each mounting arm 18 and 20 of such beam for assembly prior to drilling the mounting holes in poles 12 and 14.

A shim member 64 having a slot therein of sufficient width to slide over the shank of the bolt 44 is provided on both of the mounting bolts 44 between the upper leg 30' of the hanger members 24' and 26', and the inner surface of the sides of the box beam 10'. Thus, the number of the shims 64 provided between the hanger member and the box beam can be varied in order to adjust the spacing between the hanger members 24' and 26' for accommodating support poles 14 of different diameter or different cross-section in the case of rectangular supports. Thus, the shim 64 forms the spacing adjustment function of the threaded collar or nut 38 of the preferred embodiment of FIGS. 1 to 4.

It will be obvious to those having ordinary skill in the art that may changes may be made in the above described preferred embodiments of the invention. For example, the threaded sleeves 33, 34 and 36 can be lengthened to extend completely through the mounting arms 18 and 20 of the beam so that the outer ends of such sleeves rather than the arms are engaged by the washers 50 when nuts 46 are tightened on bolts 44, to prevent any possible splitting of the mounting arms. Therefore, the scope of the present invention should only be determined by the following claims.

I claim:

1. Transformer support rack apparatus, comprising: elongated rack means for supporting electrical transformers above the ground and having a pair spaced opposed mounting arms formed unitarily with and extending longitudinally from each of two opposite ends of the rack means;
two pairs of support bracket means attached to the opposite ends of said rack means for supporting the rack means between a pair of substantially vertical support members, each pair of bracket means including a pair of first and second hanger means for supporting the arms of one pair of mounting arms on opposite sides of one support member; and
adjustable fastening means for fastening the pair of hanger means to the support member and for adjusting the spacing between said first and second hanger means to accommodate support members of different cross-section.

2. Apparatus in accordance with claim 1 in which the adjustable fastening means includes a threaded adjustment means for adjusting the spacing between the first and second hanger means by rotation of said threaded adjustment means.

3. Apparatus in accordance with claim 1 in which the rack means is a hollow box beam.

4. Apparatus in accordance with claim 3 in which the box beam is made of laminated wood veneer members.

5. Apparatus in accordance with claim 3 in which the support members are support poles of substantially circular cross-section and the opposite ends of the box beam are each provided with a concave curved notch conforming generally to the outer surface of the support pole and extending between the pair of mounting arms.

6. Apparatus in accordance with claim 5 in which the concave curved notches at the opposite ends of the box beam are each covered with a sheet metal member to close the ends of said box beam.

7. Support apparatus, comprising in combination:
a support bracket means attaching a device to a substantially vertical support member, said bracket means including a pair of first and second hanger means supporting mounting arms of the device on opposite sides of the support member, said first and second hanger means being L-shaped hanger members, each including an upper leg portion and a lower leg portion extending substantially perpendicular thereto with said lower leg portion supporting one of said mounting arms and said upper leg portion being fastened to said support member; and
adjustable fastening means fastening said pair of hanger means to the support member and adjusting the spacing between said first and second hanger means to accommodate support members of different cross-section.

8. Apparatus in accordance with claim 7 in which the adjustable fastening means includes threaded adjustment means for adjusting the spacing between the first and second hanger means by rotation of said threaded adjustment means.

9. Apparatus in accordance with claim 7 in which each of the hanger members have a plurality of externally threaded projections extending outward from said upper leg portions which are engaged by threaded collars, said projections being spaced horizontally from each other.

10. Transformer support rack apparatus, comprising:
rack means for supporting electrical transformers above the ground and having a pair spaced opposed mounting arms extending from each of two opposite ends of the rack means;
two pairs of support bracket means attached to the opposite ends of said rack means for supporting the rack means between a pair of substantially vertical support members, each pair of bracket means including a pair of first and second hanger means for supporting the arms of one pair of mounting arms on opposite sides of one support member;
adjustable fastening means for fastening the pair of hanger means to the support member and including threaded adjustment means for adjusting the spacing between said first and second hanger means by rotation of said threaded adjustment means to accommodate support members of different cross-section; and
said adjustable fastening means including a plurality of threaded projection means which extend outwardly from the hanger means and the threaded adjustment means including collar means threadedly engaging said projection means, each projection means extending into a hole in one of the mounting arms of said rack means and said collar means engaging said one mounting arm so that changing the rotational position of said collar means adjusts the spacing between the first and second hanger means.

11. Apparatus in accordance with claim 10 in which the threaded projection means are hollow sleeves with external threads and which includes a plurality of bolts, each bolt extending through an aligned pair of said sleeves on said first and second hanger means, through said support member, and through said pair of mounting arms to fasten said rack means and said bracket means to said support member.

12. Apparatus in accordance with claim 11 in which the aligned pairs of hollow sleeves are adapted to function as drill guides for drilling bolt holes through the support members.

13. Transformer support rack apparatus, comprising:
rack means for supporting electrical transformers above the ground and having a pair spaced opposed mounting arms extending from each of two opposite ends of the rack means;
two pairs of support bracket means attached to the opposite ends of said rack means for supporting the rack means between a pair of substantially vertical support members, each pair of bracket means including a pair of first and second hanger means for supporting the arms of one pair of mounting arms on opposite sides of one support member;
adjustable fastening means for fastening the pair of hanger means to the support member and for adjusting the spacing between said first and second hanger means to accommodate support members of different cross-section; and
said hanger means being L-shaped hanger members, each including an upper leg portion and a lower leg portion extending substantially perpendicular thereto which engages the bottom of the mounting arm of the rack means, said upper leg portions of said pair of hanger means clamping said support member therebetween.

14. Apparatus in accordance with claim 13 in which each of the hanger members have a plurality of externally threaded projections extending outward from said upper leg portion which are engaged by threaded collars, said projections being spaced horizontally from each other.

15. Support apparatus, comprising:
a support bracket means for attaching a device to a substantially vertical support member, said bracket means including a pair of first and second hanger means for supporting mounting arms of the device on opposite sides of the support member, said first and second hanger means being L-shaped hanger members, each including an upper leg portion and a lower leg portion extending substantially perpendicular thereto with said lower leg portion supporting one of said mounting arms and said upper leg portion being fastened to said support member; and
adjustable fastening means for fastening said pair of hanger means to the support member and for adjusting the spacing between said first and second hanger means to accommodate support members of different cross-section; and
the adjustable fastening means includes a plurality of threaded projection means which extend outwardly from the hanger means and threaded collar means threadedly engaging said projection means, each projection means extending into a hole in one of the mounting arms of said device and said collar means engaging said one mounting arm so that changing the rotational position of said collar means adjusts the spacing between the first and second hanger means.

16. Apparatus in accordance with claim 15 in which the threaded projection means are hollow sleeves with external threads and which includes a plurality of bolts, each bolt extending through an aligned pair of said sleeves on said first and second hanger means, through said support member and through said pair of mounting arms to fasten said device and said bracket means to said support member.

17. Apparatus in accordance with claim 16 in which the aligned pairs of hollow sleeves are adapted to function as drill guides for drilling bolt holes through the support members.

* * * * *